(12) United States Patent
Parsons et al.

(10) Patent No.: US 8,891,967 B2
(45) Date of Patent: Nov. 18, 2014

(54) METHOD FOR ENERGY EFFICIENT REOPTIMIZATION OF OPTICAL NETWORKS

(75) Inventors: Kieran Parsons, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 81 days.

(21) Appl. No.: 13/218,044

(22) Filed: Aug. 25, 2011

(65) Prior Publication Data

US 2013/0051797 A1 Feb. 28, 2013

(51) Int. Cl.
*H04J 14/00* (2006.01)
*H04Q 11/00* (2006.01)

(52) U.S. Cl.
CPC ... *H04Q 11/0062* (2013.01); *H04Q 2011/0086* (2013.01)
USPC .................................. 398/57; 398/54; 398/51

(58) Field of Classification Search
CPC .................. H04Q 11/0062; H04Q 2011/0086
USPC .......................................... 398/25, 54, 51, 57
See application file for complete search history.

(56) References Cited

U.S. PATENT DOCUMENTS

| 720,956 | A * | 2/1903 | O'Brien ............................ 5/266 |
| 7,020,394 | B2 * | 3/2006 | Zhang et al. .................... 398/25 |
| 7,095,956 | B2 * | 8/2006 | Levandovsky et al. ......... 398/27 |
| 7,212,742 | B2 * | 5/2007 | Peddanarappagari et al. .. 398/38 |
| 7,224,897 | B1 * | 5/2007 | Slezak et al. ...................... 398/5 |
| 7,251,703 | B1 * | 7/2007 | Wu et al. ........................ 710/312 |
| 7,609,964 | B2 * | 10/2009 | Peddanarappagari et al. .. 398/38 |
| 8,238,748 | B2 * | 8/2012 | Kuri et al. ........................ 398/68 |
| 8,280,388 | B2 * | 10/2012 | Leung Hang et al. ......... 455/450 |
| 8,634,714 | B2 * | 1/2014 | Yim et al. ........................ 398/57 |
| 2002/0105915 | A1 * | 8/2002 | Hamada ........................ 370/252 |
| 2003/0161633 | A1 * | 8/2003 | Oki et al. ........................ 398/57 |
| 2004/0077354 | A1 * | 4/2004 | Jason et al. .................... 455/450 |
| 2004/0115703 | A1 * | 6/2004 | Schwartz et al. ................. 435/6 |
| 2004/0208511 | A1 * | 10/2004 | Peddanarappagari et al. .. 398/25 |
| 2004/0208512 | A1 * | 10/2004 | Peddanarappagari et al. .. 398/25 |
| 2004/0208513 | A1 * | 10/2004 | Peddanarappagari et al. .. 398/25 |

(Continued)

OTHER PUBLICATIONS

Baliga et al;Energy consumption in optical IP networks; Jul. 1 2009; Journal of Lightwave Technology, vol. 27 No. 13; pp. 2391-2403.*

(Continued)

*Primary Examiner* — Ken Vanderpuye
*Assistant Examiner* — Amritbir Sandhu
(74) *Attorney, Agent, or Firm* — Dirk Brinkman; Gene Vinokur (57) ABSTRACT

In optical networks new links are added between nodes over time to satisfy the increasing traffic demands of the network. Existing links are normally not changed, resulting in a network that does not have the lowest energy consumption. A method provides a way to reduce the energy consumption of the overall network while supporting the required traffic demands at all times. The network includes a multiple source nodes, and multiple destination nodes. The network is represented by a graph of nodes connected by edges, wherein each node represents an optical network element and each edge represents a path connecting two optical network elements. Each edge is labeled with a demand. The non-bridge edge with a lowest demand is removed from the graph, and the lowest demand is added to the non-bridge edge with a highest demand. These steps are repeated until a termination condition is reached.

6 Claims, 8 Drawing Sheets

(56) References Cited

U.S. PATENT DOCUMENTS

| | | | |
|---|---|---|---|
| 2004/0208556 A1* | 10/2004 | Joly et al. | 398/57 |
| 2006/0188252 A1* | 8/2006 | Schluter | 398/25 |
| 2008/0214116 A1* | 9/2008 | Leung Hang et al. | 455/67.11 |
| 2009/0010647 A1* | 1/2009 | Jenkins et al. | 398/57 |
| 2009/0296719 A1* | 12/2009 | Maier et al. | 370/400 |
| 2010/0266281 A1* | 10/2010 | Wang et al. | 398/59 |
| 2010/0329276 A1* | 12/2010 | Wang et al. | 370/419 |
| 2011/0188865 A1* | 8/2011 | Lalonde et al. | 398/156 |
| 2011/0228705 A1* | 9/2011 | Aguirre et al. | 370/254 |
| 2011/0286336 A1* | 11/2011 | Vasseur et al. | 370/238 |
| 2012/0170934 A1* | 7/2012 | Yim et al. | 398/49 |
| 2012/0198092 A1* | 8/2012 | Sheridan et al. | 709/241 |
| 2012/0207048 A1* | 8/2012 | Kim | 370/252 |
| 2012/0323833 A1* | 12/2012 | Markram et al. | 706/27 |
| 2013/0177312 A1* | 7/2013 | Nandagopal | 398/49 |
| 2014/0016925 A1* | 1/2014 | Ceccarelli et al. | 398/5 |

OTHER PUBLICATIONS

Zhou et al; network simpliifcation with minimal loss of connectivity; 2010; IEEE International conference on Data mining ;pp. 659-668.*

Fang Zhou et al; Network simpliifcation with Minimal loss connectivity; 2010; IEEE international conference on Data mining; pp. 659-668.*

* cited by examiner

METHOD FOR ENERGY EFFICIENT REOPTIMIZATION OF OPTICAL NETWORKS

FIELD OF THE INVENTION

This invention relates generally to optical networks, and more particularly to reoptimizing the links in an optical network in an energy efficient manner.

BACKGROUND OF THE INVENTION

Optical networks continue to grow at a high rate, driven by the increase in the size of the Internet. As they grow their energy consumption increases, so that the combined energy consumption of the data network has become a significant fraction of the total energy consumption of a country. For example, Telecom Italia's network consumed over 2 TWh in 2005, which is approximately 1% of the total Italian energy demand. It is therefore important to find methods to reduce the energy consumption of optical networks.

Optical networks are not fully planned and constructed at one time, but have a tendency to grow by adding new links to increase capacity, with minimal modification to the current links in order to minimize disruption. It is known that in the Optical Transport Network (OTN) larger Optical Data Units (ODUs) can be transported and switched using much lower energy than smaller ODUs. Therefore, optical links with large amounts of traffic consume less energy per bit than links with a smaller amount of traffic. This means that over time the energy efficiency of the optical network will move away from an optimum, even if the original design had close-to-optimum energy consumption.

It is possible to reduce the energy consumption of the network by changing the network topology, either in part or in total, as links are added or removed. However, this would be costly because it would involve changing network equipment, and disruptive because network operation would be interrupted. In most cases it is important to minimize the disruption in the traffic by only changing links that have the most significant impact to energy consumption. We teach a method to reduce network energy consumption with a minimal amount of traffic redistribution.

SUMMARY OF THE INVENTION

Embodiments of the invention provide methods to reoptimize an optical network in order to improve its overall energy consumption. The embodiments determine changes to the network that provide a good improvement in energy efficiency with only a small number of changes, by favoring large bundles of traffic on links in the network. In this way the energy efficiency can be improved significantly with minimal disruption to current traffic.

DETAILED DESCRIPTION OF THE PREFERRED EMBODIMENT

Figure 1:
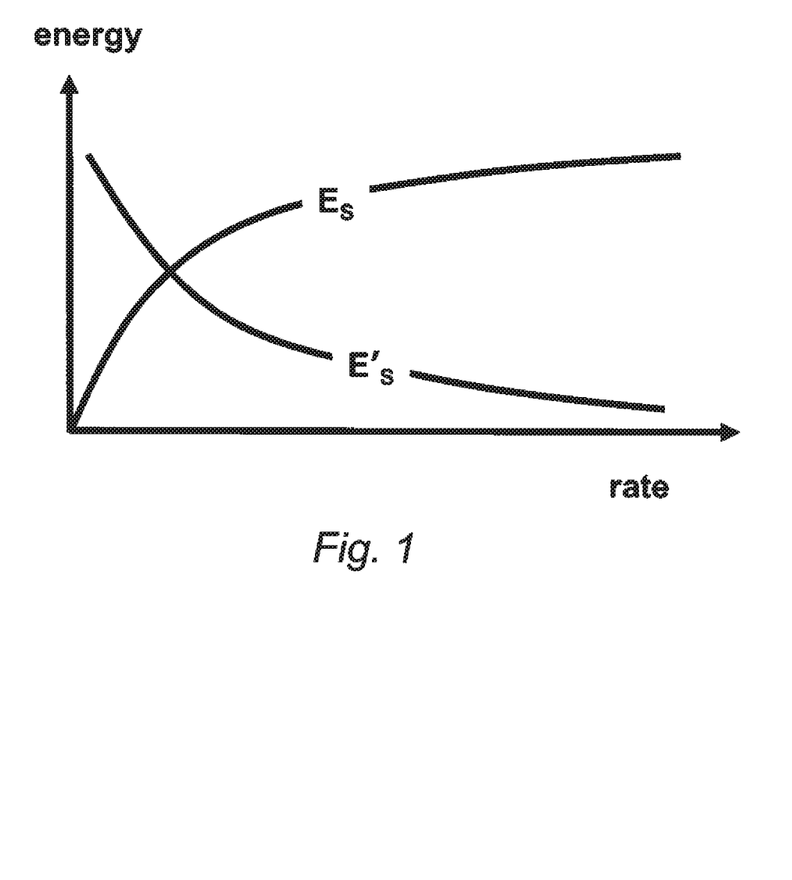
FIG. 1 is a graph of energy and derivative of energy as a function of data rate.

In general, the energy consumption of the network is dominated by the switching and routing functions. An ODU Cross-Connect (XC) has reduced energy consumption per bit compared to a Layer 3 (L3) router, Ethernet Switch or SONET/SDH XC. In addition, larger ODU sizes require less energy to switch and transport than smaller ODU sizes. The ODU sizes are not continuously adjustable; rather the currently defined sizes are 1.25 Gbps (ODU0), 2.5 Gbps (ODU1), 10 Gbps (ODU2), 40 Gbps (ODU3), and 100 Gbps (ODU4). However, for illustration of the methods we assume that the energy consumption $E_S$ as a function of data rate R is a continuous concave function with diminishing slope, as shown in FIG. 1. Specifically for the values presented we assume that $E_S(R) = 2*sqrt(R)$. Note that every link has a maximum capacity.

Because $E_S$ is a concave function with diminishing slope, the marginal energy consumption, $E'_S$ (where the symbol $E_S'$ denotes the derivative of $E_S$), will be a continuously reducing function. Thus, for the values presented we assume that $E'_S(R) = 1/sqrt(R)$.

Figure 2:
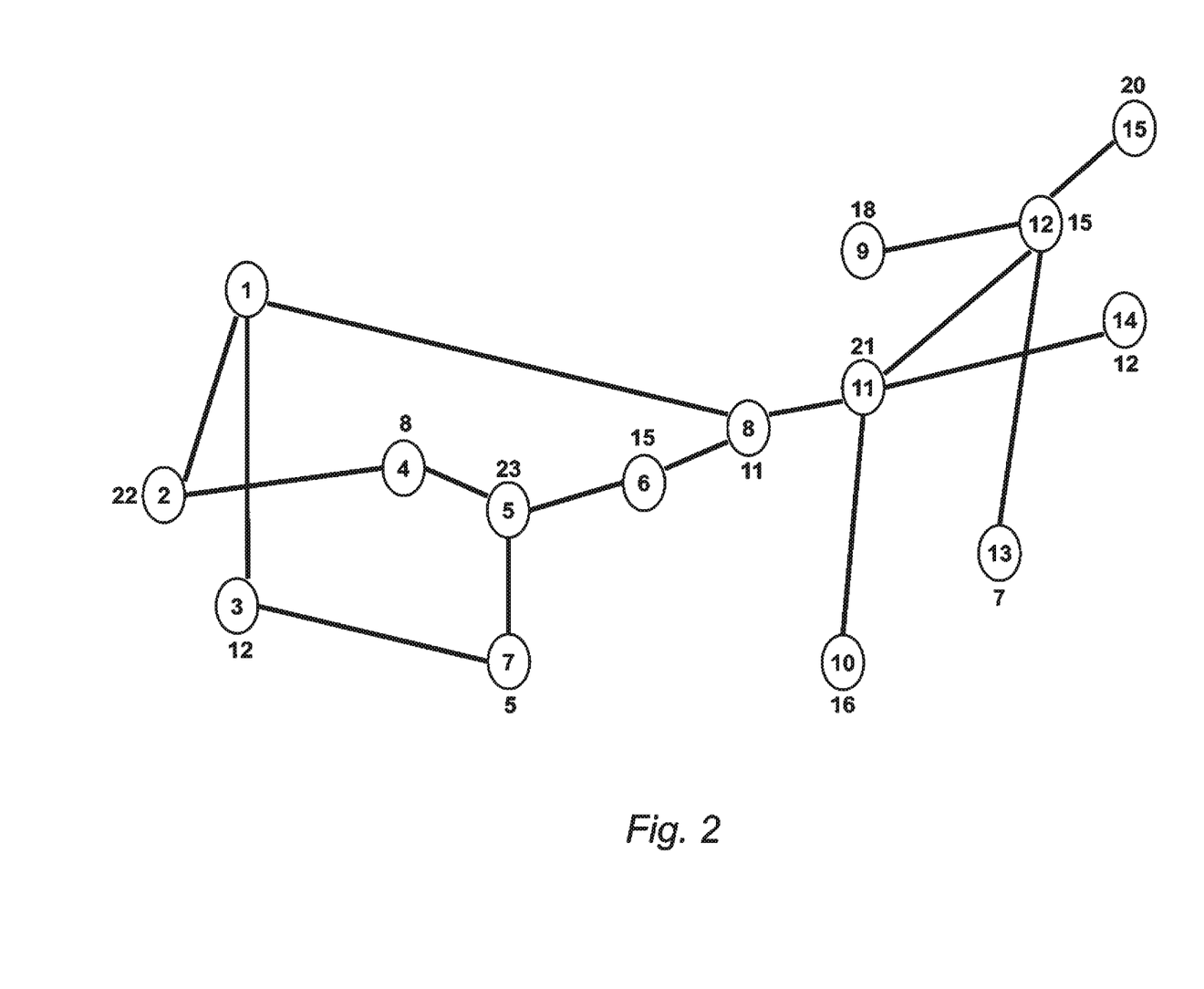
FIG. 2 is a schematic of the graph of network connections between fifteen nodes with example traffic demands.

We now consider the example network shown in FIG. 2 including fifteen nodes, labeled 1, 2, . . . 15, and optical links, which are denoted by the lines connecting the nodes. The nodes represent optical network element, e.g., routers, switches, and cross-connects. In general, the energy consumption of the network is dominated by the switching and routing functions. An ODU Cross-Connect (XC) has reduced energy consumption per bit compared to a Layer 3 (L3) router, Ethernet Switch or SONET/SDH XC. In addition, larger ODU sizes require less energy to switch and transport than smaller ODU sizes. The optical link between two adjacent nodes is termed an "edge." We define a "path" as a sequence of connected edges linking two nodes. The traffic demand between a source node and a given destination node j is termed the "demand," denoted by D(i, j).

To illustrate the energy reduction method, we assume the network in FIG. 2 with a single source node i=1 with fourteen destination nodes j, 2, . . . 15. The demand D(1, j), is given by the values next to the nodes. For example, the demand D(1, 3) is equal to 22 units of traffic, D(1, 3) is equal to 12 units of traffic and D(1, 4) is equal to 8 units of traffic.

In the general case there may be more than one path linking two nodes and so the demand is be shared across each path. If there are M paths defined between nodes i and j, the traffic demand for path k (where k=1, . . . , M) is termed the "path demand" and is denoted by PD(i,j,k). Note that the demand is equal to the sum of the path demands, that is $D(i,j)=\Sigma_1^M PD(i,j,k)$. As there are many source and destination nodes, a given edge has traffic associated with a number of different paths. The traffic demand on an edge is termed the "edge demand."

As described by way of example below, the edge demand on any particular link, (i,j), is a function of the total demand between all sources and destinations and the number of paths between sources that contain the edge (i,j). The capacity of each edge to carry any portion of the demand can initially be allocate so that the basic constraints are satisfied, i.e., all demands are satisfied and no edge is allocated more demand than its capacity. Thus, the demand can be allocated in a number of ways. We assume edge demands as shown in FIG. 3, and we describe how given a new allocation that lowers the energy consumption can be found for the initial edge demand allocation.

For most nodes, there are multiple possible paths through the network to get from node j to node 1 to satisfy the demand. For example, from node 11 there is one possible path to node 1 using nodes using nodes 11⇔8⇔6⇔5⇔4⇔2⇔1 (amongst other options), where "⇔" indicates an edge. Note that edges can be unidirectional, bidirectional with different edge demands in each direction, or bidirectional with equal edge demands in each direction. Bidirectional edges with equal edge demands are shown for simplicity.

Figure 3:
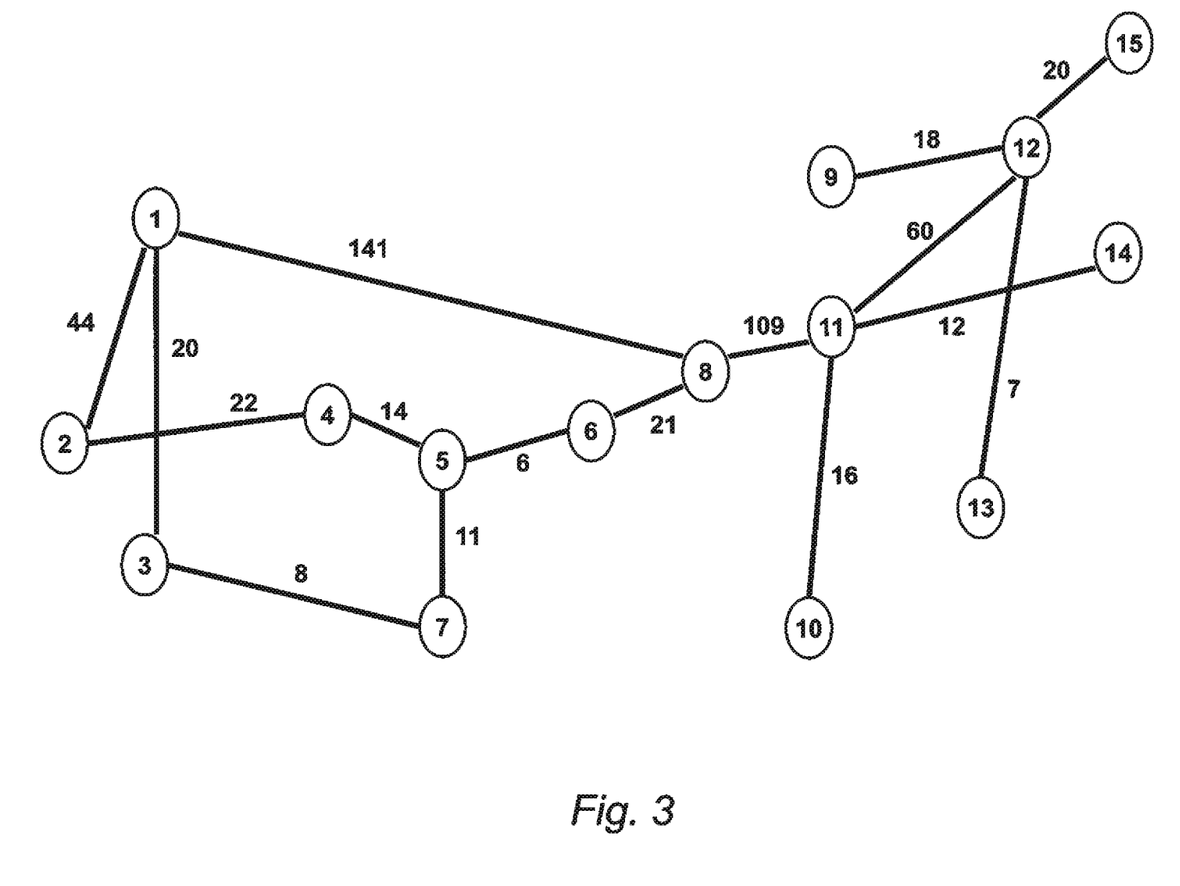
FIG. 3 is a schematic of example edge demands in the network of FIG. 2.

In FIG. 3, for the purposes of illustration we assume that the demand from node 1 to node N, (N=2, 3, . . . , 15) is supported by only one path, except for 1⇔7 and 1⇔5, whose demand is split amongst 3 paths each. The demands are split over the following paths: 1⇔7 demand, split into paths 1⇔3⇔7, 1⇔2⇔4⇔5⇔7 and 1⇔8⇔6⇔5⇔7 with path demands 1, 2 and 2 respectively (total of 5, which is the 1⇔7 demand), and 1⇔5 demand, split into paths 1⇔3⇔7⇔5, 1⇔2⇔4⇔5⇔ and 1⇔8⇔6⇔5 with paths demands 7, 12 and 4 respectively (total of 23, which is the 1⇔5 demand). The total energy consumed by the network using the assumptions provided earlier is the sum of all the edge energies given by $2\sqrt{edgedemand}$. In this case, the total energy consumed is 163.2 units of energy.

Figure 4:
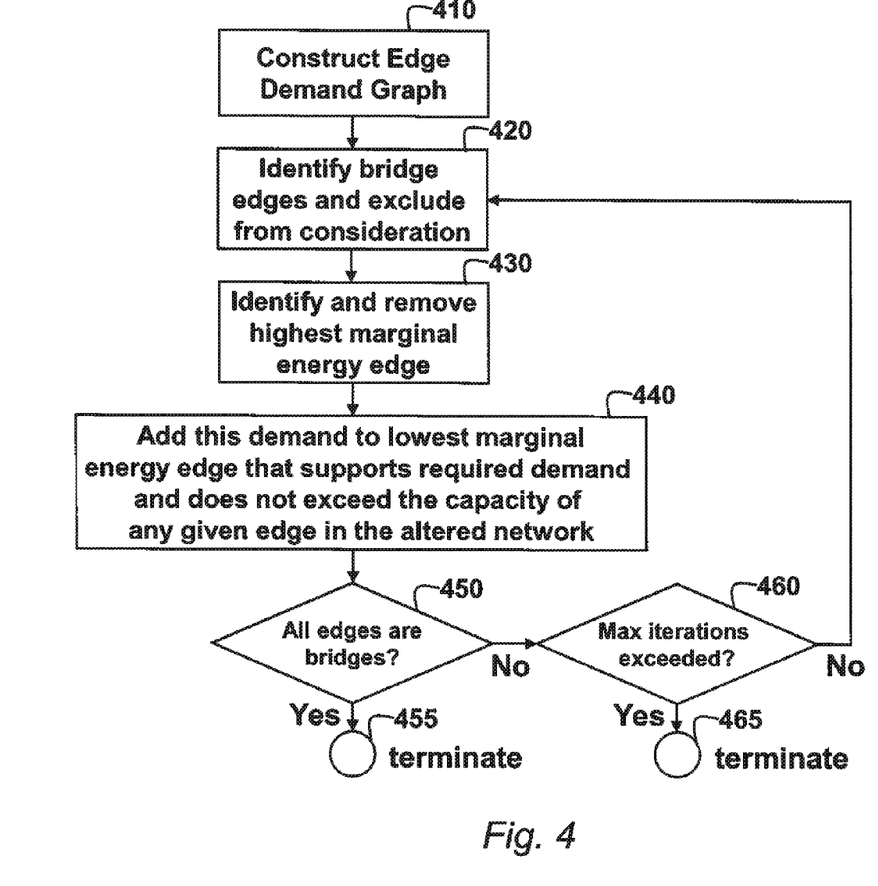
FIG. 4 is a flow diagram of a method to reoptimize energy efficiency of the network according to embodiments of the invention.

FIG. 4 shows a method for improving energy efficiency in an optical network while satisfying all the demands at each step according to the embodiments of the invention. The steps of the method, and any other processes described herein can be performed in a processor connected to memory and input/output interfaces as known in the art.

First, we construct 410 a graph representing network. The network include node connected by edges. The edges are associated traffic demands between the nodes.

We identify and exclude 420 bridge edges in the network using the graph, where a "bridge edge" is an edge, if removed, results in an unconnected network. This can be performed using a known procedure.

Next, we identify and remove 430 which of the remaining edges has a highest marginal energy (lowest demand). This edge is removed from the network and the lowest demand is added 330 to the edge with the lowest marginal energy that meets the following conditions: supports the required demand, and does not exceed the capacity of any given edge in the altered network If two or more edges have the same lowest marginal energy, then one is selected arbitrarily.

We now check 450 to see if all remaining edges in the network are bridge edges and if yes, terminate 455. If no, check 460 if a maximum number of allowed iterations has been exceeded and if yes, terminate 465. If not, then repeat beginning at step 420.

Figure 5:
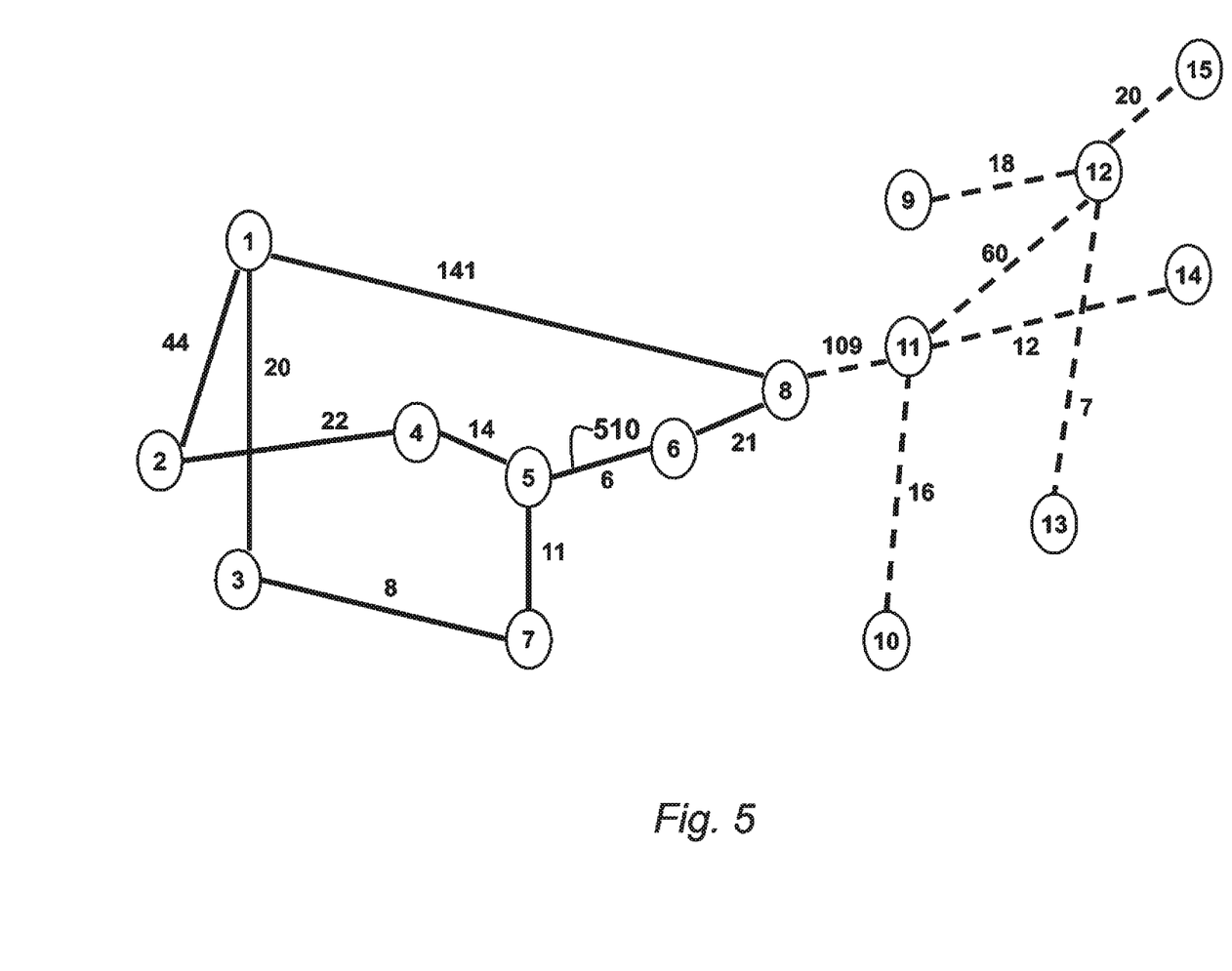
FIG. 5 is a schematic of the network graph after the first step of the method.

FIG. 5 shows the network graph at steps 420 and 430. The bridge edges determined in step 420 are illustrated by the dashed lines. The edge identified to have the highest marginal energy (lowest demand) in step 430 is edge 5⇔6 510.

Figure 6:
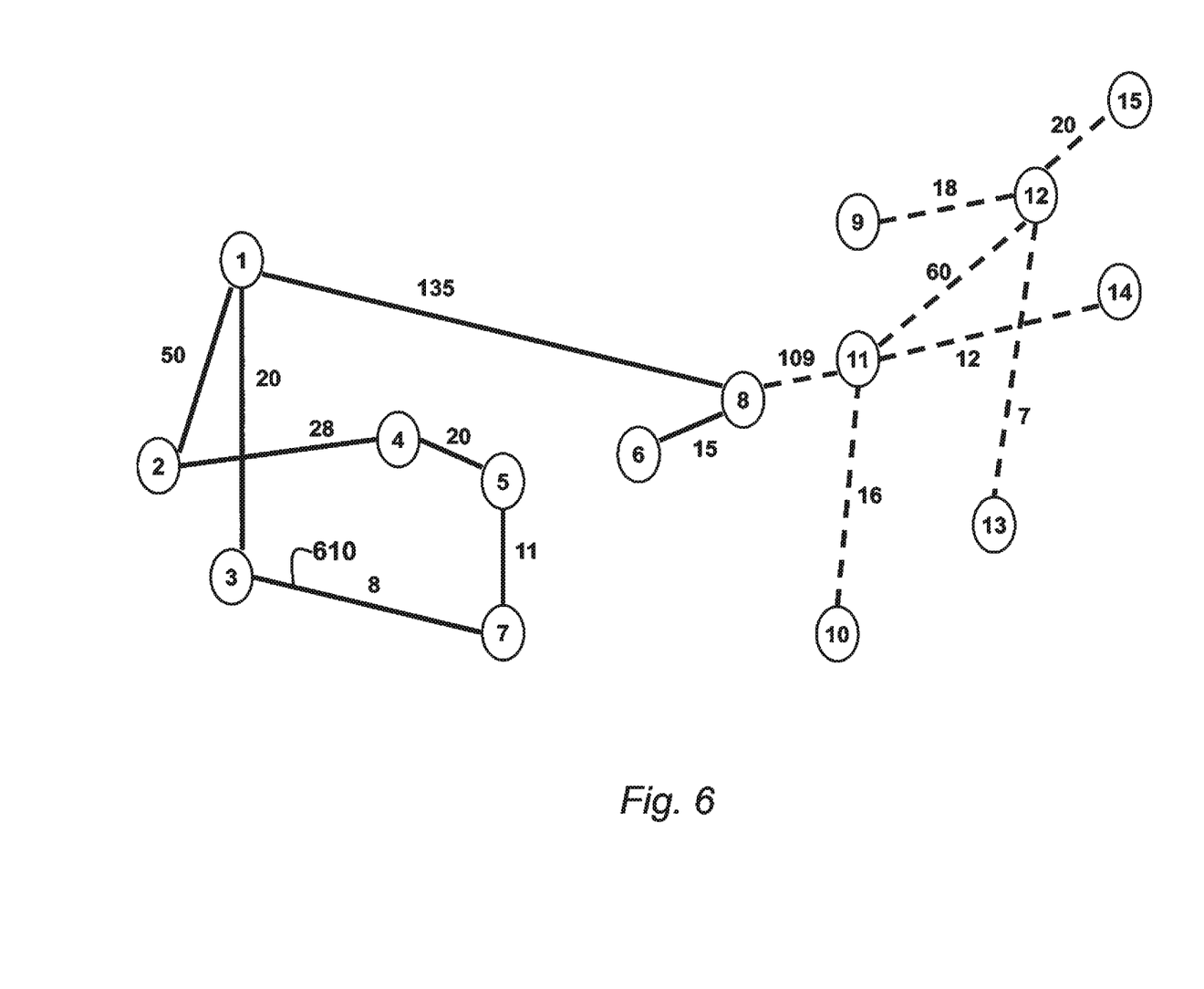
FIG. 6 is a schematic of the network graph after the second step of the method.

FIG. 6 shows the network graph at steps 430 and 440. The 5⇔6 edge is removed from the network and the removed edge demand (6) is added to the edges 5⇔4, 4⇔2, 2⇔1 because the lowest marginal energy edge supporting paths which use node 5 is the 5⇔4 edge. It is also removed from the 6⇔8 and 8⇔1 edges because it is no longer needed to support paths using those nodes. Because not all edges are bridge edges the method will continue. In the next iteration the edge 610 to be removed is 3⇔7.

Figure 7:
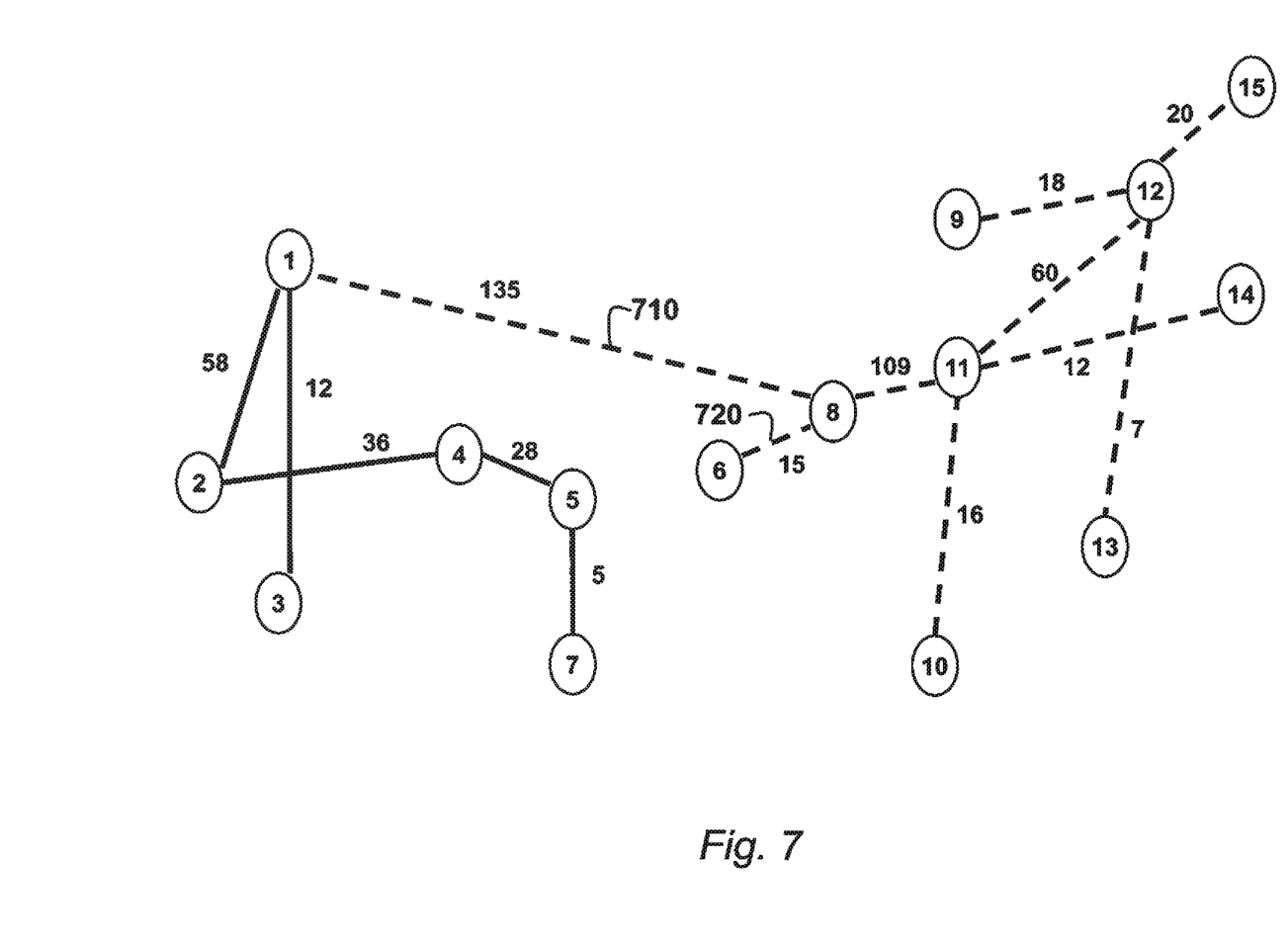
FIG. 7 is a schematic of the network graph after the third step of the method.

FIG. 7 shows the network graph after step 420 and 430 of the second iteration. The edges 710 and 720 have been identified as bridge edges and removed from consideration. The 3⇔7 edge has also been removed and its demand added to the other edges as described previously. At this stage all the edges are bridge edges and so the method terminates.

Figure 8:
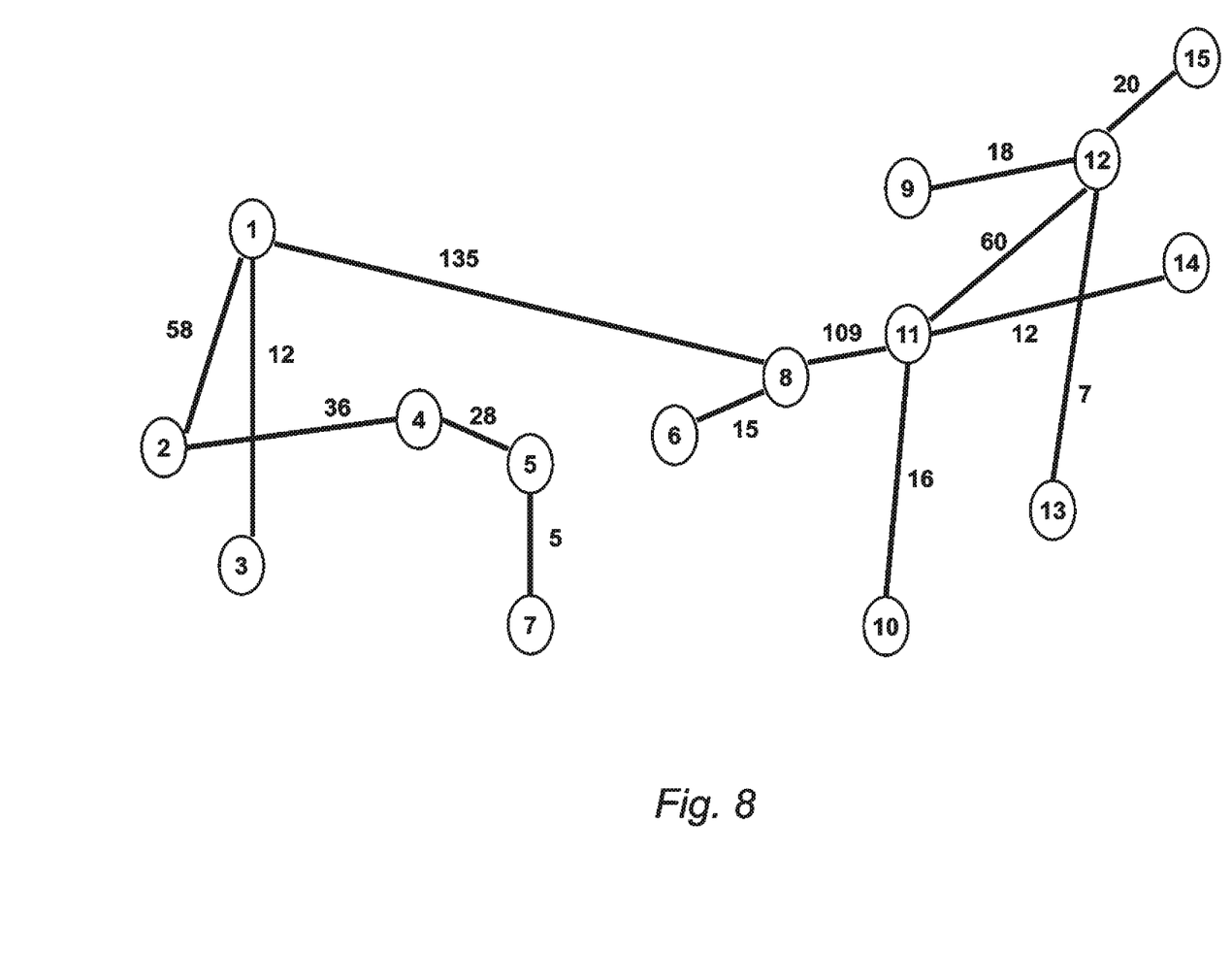
FIG. 8 is a schematic of the network graph after the method is complete.

FIG. 8 shows the network graph after the method has completed. The total energy is computed as before for the new network and found to be 154.2, a saving of (163.2−154.2)/163.2=5.5% in this example.

For multiple-source multiple-destination, the algorithm is analogous to the single-source case. The edge demand is found as before, but considering all demands between the N nodes, D(1, j) rather than just the demands from a root node, D(1, j) in the example presented. The bridge edges are removed and the edge with the highest marginal energy that supports the two conditions described is found. This edge is then removed and its edge demand is redistributed over the other edges for each of the paths that are supported by this edge. This procedure continues as before until the maximum number of iterations is reached, or there are no more bridge edges.

Extension to Other Protocols

The prior descriptions dealt only with OTN, but it is important to note that the same algorithms can be applied to other protocols, including those transported by OTN. As an example, consider Label Switched Paths (LSPs) in MPLS (Multi-Label Protocol Switching). LSPs can be carried by OTN and may be quasi-static in nature. As such, they may be reoptimized so that they are carried by higher rate ODUs so freeing up lower rate ODUs and improving energy efficiency. This uses the same algorithm as described.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for improving an efficiency of transferring energy in an optical network including a plurality of source nodes, and a plurality of destination nodes, comprising the steps of:

representing the network as a graph of nodes connected by edges, wherein each node represents an optical network element and each edge represents an optical link connecting two adjacent optical network elements;

labeling each edge with an edge demand, wherein the edge demand is a demand for units of traffic in the optical network through the edge, the edge demand equals a sum of path demands for a number of paths in the graph through the edge according to $D(i,j)=\Sigma_1^M PD(i,j,k)$, wherein $D(i,j)$ is the edge demand of the edge between nodes i and j, M is the number of paths between the nodes i and j, $PD(i,j,k)$ is a path demand of a path k, k=1, . . . M;

identifying non-bridge edges;

removing the non-bridge edge with a lowest edge demand from the graph, wherein the lowest edge demand is greater than zero;

adding the lowest edge demand to the non-bridge edge with a highest edge demand, wherein the lowest edge demand corresponds to a highest marginal energy, and a highest edge demand corresponds to a lowest marginal energy;

repeating the labeling, identifying, removing and adding steps until a termination condition is reached; and commanding to redistribute the units of traffic according a topology of the graph upon reaching the termination condition, wherein steps of the method are performed by a processor.

2. The method of claim 1, wherein the marginal energy is a derivative of an energy consumption.

3. The method of claim 1, wherein the lowest demand is only added if a capacity of the non-bridge edge is not exceeded.

4. The method of claim 1, wherein multiple edges have a highest demand, and the lowest demand is arbitrarily added to one of the multiple edges.

5. The method of claim 1, wherein the termination condition is that all edges are bridge edges.

6. The method of claim 1, wherein the termination condition is a maximum number of iterations.

* * * * *